United States Patent [19]
Horvat et al.

[11] 3,817,571
[45] June 18, 1974

[54] AUTOMATIC SEAT BACK LATCH RELEASE

[75] Inventors: Rudolph M. Horvat, Allen Park; Alexander Molnar, Livonia, both of Mich.

[73] Assignee: Ford Motor Company, Dearborn, Mich.

[22] Filed: May 29, 1973

[21] Appl. No.: 364,989

[52] U.S. Cl. .............................. 296/65 A, 296/68
[51] Int. Cl. .................................... B60n 1/02
[58] Field of Search ................ 296/65 A, 68, 65 R; 297/379, 369, 372

[56] References Cited
UNITED STATES PATENTS
| | | | |
|---|---|---|---|
| 2,559,548 | 7/1951 | Scigneur | 296/65 A |
| 2,828,806 | 4/1958 | Saffer | 296/65 A |
| 3,444,949 | 5/1969 | Pollock | 297/379 X |

FOREIGN PATENTS OR APPLICATIONS
| | | | |
|---|---|---|---|
| 1,430,385 | 10/1968 | Germany | 296/65 H |

Primary Examiner—Allen N. Knowles
Attorney, Agent, or Firm—Keith L. Zerschling; John J. Roethel

[57] ABSTRACT

A vehicle seat latching system for latching a pivoted backrest structure to a seat cushion supporting structure. The latching system comprises a spring-loaded pivoted latch device on the backrest structure engagable with a keeper device carried on the seat cushion supporting structure. A remote control mechanism responsive to movement of a vehicle door into or out of door closed position actuates a latch device displacement means. When the vehicle door is moved to an open position, movement is transmitted from a sensor device through a reciprocable wire element to the latch device displacement means which drives the latch device out of latching engagement with the keeper device to permit the seat backrest to be forwardly tiltable.

4 Claims, 5 Drawing Figures

PATENTED JUN 18 1974 3,817,571

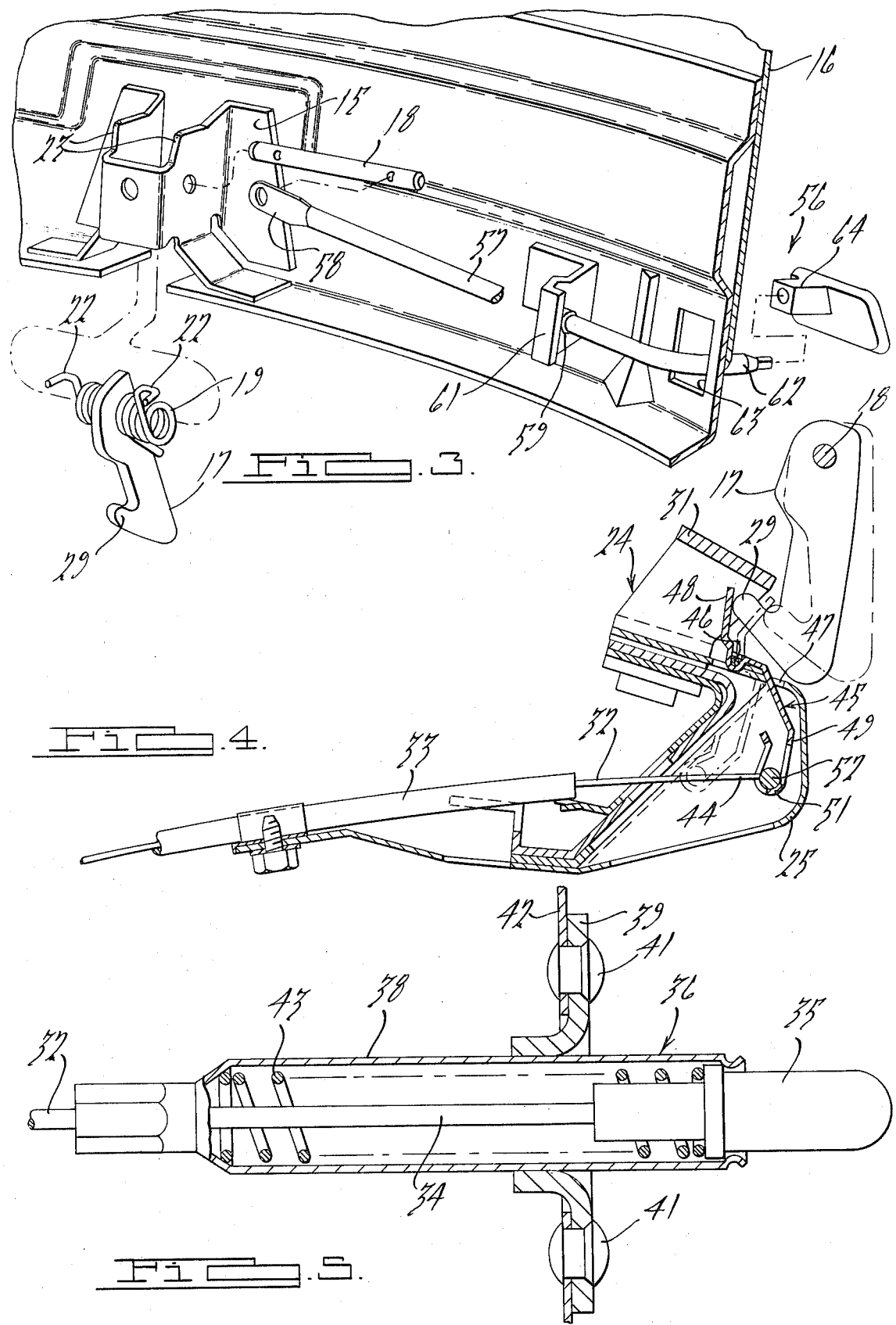

AUTOMATIC SEAT BACK LATCH RELEASE

BACKGROUND OF THE INVENTION

U.S. Pat. Nos. 2,559,548 issued to F. O. Seigneur on July 3, 1951 for a "Latchable Seat;" 3,339,976 issued to R. Karl on Sept. 5, 1967 for an "Automobile Seat Backrest Locking Device" and 3,516,704 issued to W. C. Reister on June 23, 1970 for a "Latch Release System" exemplify the prior art relating to vehicle seat latching systems for holding a pivotally supported seat back against movement relative to a horizontal seat member or cushion.

The purpose of such latching systems is to prevent a seat back from swinging forwardly about its pivot axis and pushing the seat occupant in a forward direction upon a "panic stop" or a front-end collision of the vehicle. A further purpose is to permit the latched seat back under "panic stop" or impact conditions to act as a cushioned crash barrier against which rear seat passengers may be thrown with a minimum of injury to such passengers. As illustrated by the three patents listed above, the vehicle seat latching system may be a mechanical system as disclosed in U.S. Pat. No. 2,559,548, a solenoid actuated system as disclosed in U.S. Pat. No. 3,339,976 or a vacuum operated system as disclosed in U.S. Pat. No. 3,516,704. All three patents have in common the feature that a sensor device senses whether or not the vehicle door is opened or closed. When the vehicle door is open, the latch device latching the seat backrest structure against pivotal movement is released so that the seat back may be tilted to provide ingress or egress relative to the rear compartment of the vehicle.

Vacuum systems are currently somewhat in disfavor in view of the demands on the engine vacuum system caused by emission control devices. Electrically controlled systems are somewhat in disfavor because of the great number of electrical accessories found on present-day vehicles, again partly due to the fact that vacuum devices have not been used because of their effect on emission control systems. Therefore, an all mechanical system such as shown in U.S. Pat. No. 2,559,548 is currently considered to be the most advantageous. One disadvantage noted in the mechanical system disclosed in U.S. Pat. No. 2,559,548 is that no provision is made for disengaging the latching system if desired when the vehicle door is closed or in the event that the mechanism jams or is disabled for any reason.

It is an object of the present invention to provide a completely mechanically operative door latching system which permits release of the latch device even though the remote control mechanism calls for the latch device to be engaged with the keeper device because the vehicle door is in a closed position.

SUMMARY OF THE INVENTION

The vehicle seat latching system embodying the present invention for latching a pivot backrest structure to a seat cushion supporting structure comprises a pivoted latch device carried on a frame member of the backrest structure. A spring means urges the latch device into latching engagement with a keeper device carried on the seat cushion supporting structure. A remote control mechanism is provided for disengaging the latch device from the keeper device. The remote control mechanism has a reciprocable wire element coupled at one end to a spring-loaded sensor device mounted on a vehicle door pillar for abutment by a vehicle door when the latter is in a closed position. The improvement embodied in the present invention comprises a latch device displacing means fulcrummed on the seat cushion supporting structure adjacent the keeper device and having a part thereof in abutting relation to the latch device when the latter is in keeper device engaging position, the latch device at all times being freely movable away from abutment with the displacing means. A coupling means couples the disengaging means to the reciprocable wire element for movement in response to movement of the sensor device into the door opening when the vehicle door is moved out of abutting relation to the sensor upon the door being opened. Thus, upon being moved by the reciprocable wire element, the latch device displacing means engages the latch device and drives the latter against the resistance of its spring means out of engagement with the keeper device to permit tilting movement of the backrest.

DESCRIPTION OF THE DRAWINGS

Further features and advantages of the present invention will be made more apparent as this description proceeds, reference being had to the accompanying drawings, wherein:

FIG. 3 is an exploded view of a portion of the seat back frame structure illustrating the auxiliary lever means for releasing the latch device independently of the remote control mechanism;

FIG. 4 is a vertical section view through the lower portion of the seat back frame structure illustrating the operative relationship of the latch device, the keeper device and the latch device displacing means; and FIG. 5 is a vertical section through the sensor device mounted in the door pillar.

DETAILED DESCRIPTION OF THE INVENTION

Figure 1:
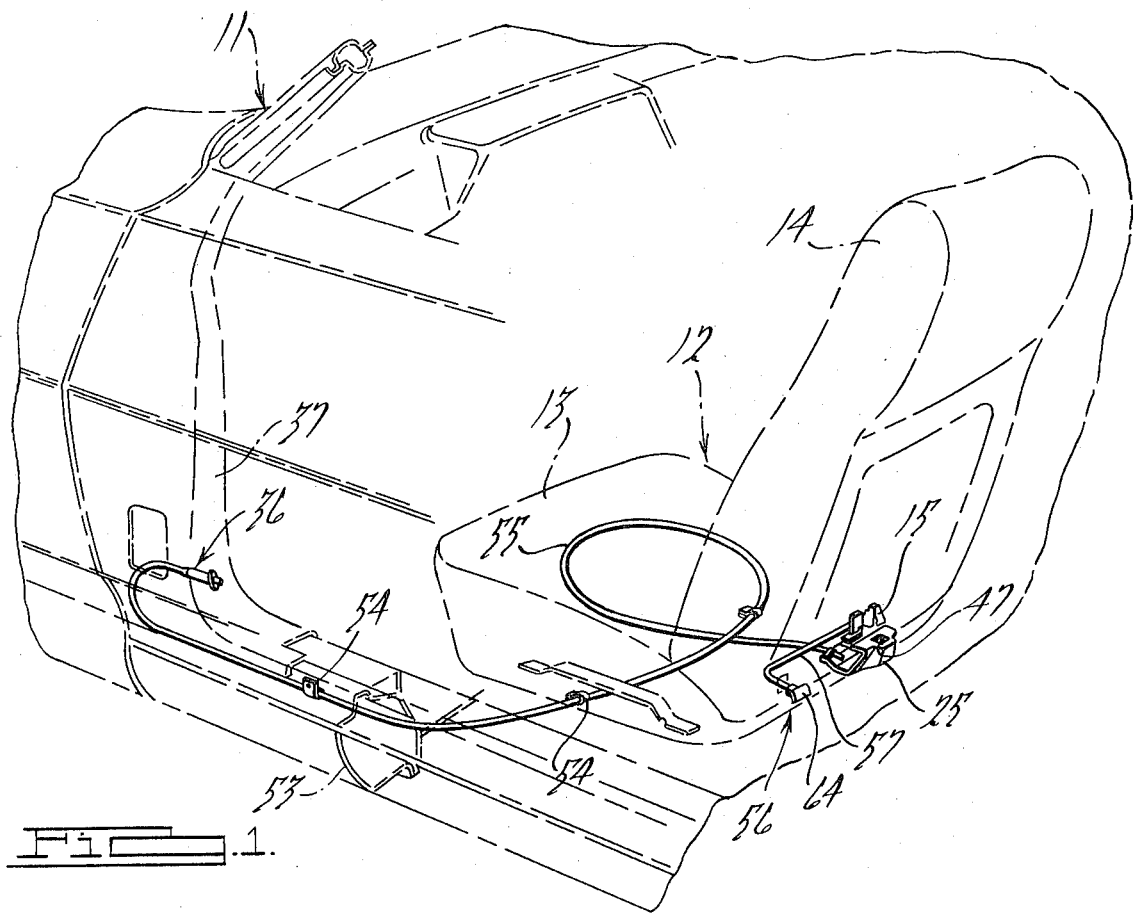
FIG. 1 is a fragmentary perspective view of a portion of a vehicle body illustrating the vehicle seat latching system embodying the present invention.

Referring now to the drawings and particularly to FIG. 1, there is shown in dot and dash outline a portion of a vehicle body, generally designated 11, in which a seat structure 12 is positioned, the seat structure having a seat cushion 13 and a seat back 14 which is pivotally supported so that it may be tilted forwardly to provide greater access to the rear passenger or cargo area of the vehicle body.

Under normal conditions, the relationship of the center of gravity of the seat back to its pivotal support is such that the seat back will be maintained in an upstanding condition unless deliberately tilted forwardly. Under "panic stop" or "accident impact" deceleration the seat back, if unrestrained, has a tendency to swing forwardly about its pivot axis. This free swinging movement has the disadvantage that it is likely to add increased impetus to the forward movement of the seat occupant or to destroy the effectiveness of the seat back as a cushioned barrier inhibiting forward movement of a rear seat occupant under "panic stop" or accident impact conditions. Accordingly, all vehicle seat structures having a pivoted seat back are required to have a latch mechanism for preventing such forward tilting movement of the seat back other than when it is desired to manually tilt the seat forward with the vehicle door open to provide increased access to the rear seat area.

Figure 2:
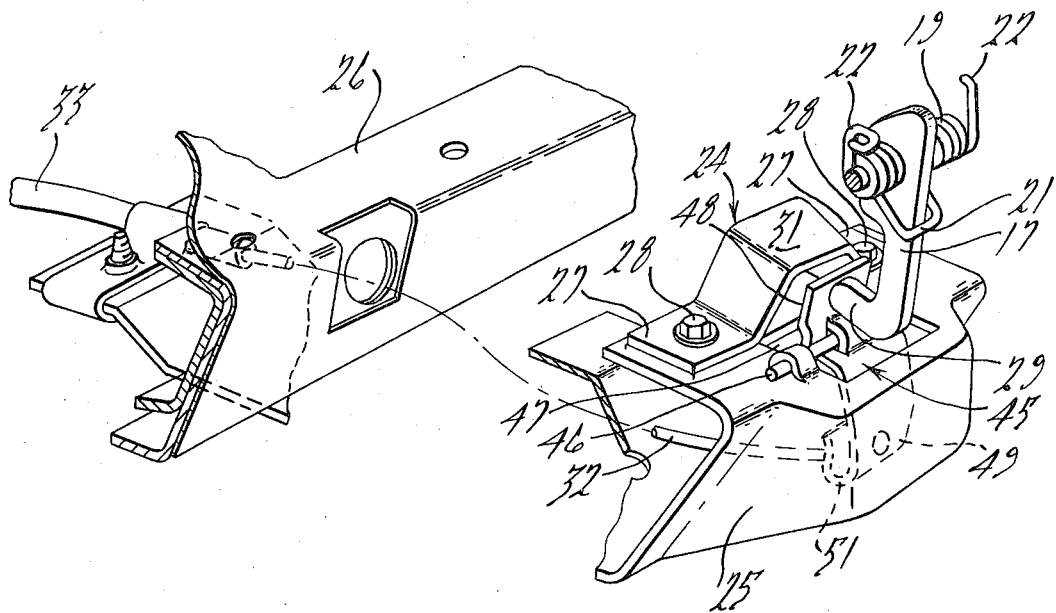
FIG. 2 is an exploded view of a fragmentary portion of the vehicle seat cushion supporting frame and of the backrest supporting frame with the latch device shown in operative relationship to the keeper device and the latch device displacing means.

The illustrated latch mechanism is adapted to be mounted on a bracket 15 positioned on a seat back frame member 16, the bracket 15 being mounted midway between the sides of the seat back, see FIG. 1. The latch mechanism comprises a hook-like latch device 17 pivotally mounted at its upper end on a pivot shaft 18 journalled in the bracket 15. A spring means 19 fits over the pivot shaft 18. The spring means 19 has a center bar 21 engaging the latch device 17 and hook end portions 22 adapted to hook over the side wall portions 23 of the bracket 15. This spring means 19 normally urges the latch device 17 into latching engagement with a keeper device 24 (see FIG. 2) adapted to be supported on a bracket 25 secured to the seat cushion support structure or frame member 26.

The keeper device 24 is an inverted U-shaped member having laterally extending flanges 27 adapted to be bolted by bolts 28 to the upper surface of the bracket 25. In latched position the lower hook-end portion 29 of latch device 17 is aligned with the center base portion 31 of the keeper device 24.

The present invention embodies a remote control mechanism for moving the latch device 17 against the resistance of spring 19 out of latching engagement with the keeper device 24. The remote control mechanism comprises a wire element 32 encased in a plastic sheath 33 for reciprocal movement. At one end 34 the wire element 32 is coupled to a plunger member 35 of a sensor device 36 adapted to be mounted in a front door hinge pillar 37 of the vehicle body 11. The plunger member 35 is journalled in a tubular housing 38 supported in an apertured mounting plate 39 adapted to be held with rivets 41 to the sheet metal 42 of the hinge pillar 37. The housing contains a compression spring 43 which urges the plunger member 35 outwardly or into the vehicle door opening when the vehicle door is open. This position of the plunger member is best seen in FIG. 5. It will be understood that when the vehicle door is closed, the plunger member 35 will be urged into the housing 38 placing the compression spring 43 under compression.

The other end 44 of the wire element 32 is coupled to a latch device displacing means, generally indicated at 45, fulcrummed on the bracket 25. The latch device displacing means 45 comprises a double arm lever pivoted intermediate its ends on a pivot shaft 46 spanning an aperture 47 in the upper surface of bracket 25. The double arm lever comprises an upstanding lever arm 48 and a depending lever arm 49. The upstanding lever arm 48, as best seen in FIG. 4, is adapted to abut the nose portion of the hook 29 on the latch device 17 in seat back latched position of the latter. The depending arm 49 terminates in a U-shaped end portion 51 adapted to receive a ball or cylindrically-shaped enlargement 52 to which the end of 44 of wire element 32 is secured so that movement of the wire element 32 may be transmitted to the latch device displacing means 45. The wire element 32 encased in its sheath 33 passes from the sensor device 36 through the side sill portion 53 of the vehicle body 11 and then under the seat 12. Suitable fastening devices 54 anchor the sheath 33 to the vehicle floor. The sheath 33 and the wire element 32 are formed under the seat 12 in an enlarged loop 55 to accommodate fore and aft movement of the seat 12.

An auxiliary lever means, generally designated 56, is also operable to move the latch device 17 in seat back unlatching direction. As best seen in FIG. 3, the auxiliary latching means 56 comprises an elongated rod 57 connected at its end 58 to the latch device pivot shaft 18. The rod 57 is journalled intermediate its ends in a bushing 59 mounted in a bracket 61 supported on the frame member 16. The rod 57 terminates in a crank 62 projecting through an aperture 63 in the frame member 16. The crank 62 carries a suitable handle 64.

OPERATION

As shown in FIG. 4, the latch device 17 is positioned so that any force tending to tilt the seat back 14 forwardly will be restrained by the hook portion 29 of the latch device engaging the center base portion 31 of the keeper device 24. The remote control mechanism for displacing the latch device from its seat back latched position is conditioned so that the latch device displacing means 45 is positioned with its upper arm 48 in abutting relation to the hook portion 29 of the latch device 17. The wire element 32 extends out of its sheath 33 to hold the lower arm 49 of the double arm lever as far to the right as it will go as viewed in FIG. 4. This is because the sensor device plunger 35 which is shown in FIG. 5 as being extended from the tubular housing has been pushed inwardly to the left, as viewed in the drawings, by a portion of the end wall (not shown) of the vehicle door when the latter is in a closed position within the body opening. The spring 43 of the sensor device is under compression when the plunger device 35 is pushed into the tubular housing 38.

Upon the vehicle door being opened, the plunger 35 is moved to the right by spring 43 and pulls the reciprocal wire 32 in the same direction. As a result of the movement of the reciprocal wire element 32, the lower arm 49 of the double arm lever of the latch device displacing means 45 is moved in a clockwise direction about the pivot shaft 46 to the dot and dash outline position shown in FIG. 4. As a result, the upper arm 48 pushes on the hook portion 29 of the latch device 17 and swings the latter in a counterclockwise direction about its pivot axis 18 out of alignment with the base member 31 of the keeper device 24. Pressure may then be applied to the top of the seat back 14 and the seat back tilted forwardly.

It is important to note that the lever arm 48 is capable of driving the latch device 17 only in latch disengaging direction against the resistance of the spring 19. The spring 19 is designed so that it can be overcome by the force exerted by the compression spring 43 in the sensor device 36. The latch device 17 is movable independently of the lever arm 48 through the auxiliary unlatching means 56. That is, if the handle 64 on the crank 62 of the rod 57 is raised, the latch device 17 will be moved to unlatched position. This may be desirable in the event that the remote control mechanism becomes disabled or inoperative for any reason. It may also be convenient to have the auxiliary latching mechanism 56 in the event that it is desired to tilt the seat forwardly while the vehicle door is in a closed position, a position that normally would result in the latch device 17 being positioned in seat back latching position.

It is to be understood this invention is not limited to the exact construction illustrated and described above, but that various changes and modifications may be made without departing from the spirit and scope of the invention as defined by the following claims:

We claim:

1. A vehicle seat latching system for latching a pivoted backrest structure to a seat cushion supporting structure, the latching system comprising a pivoted latched device carried on a frame member of the backrest structure, spring means urging the latched device into latching engagement with a keeper device carried on the seat cushion supporting structure, and a remote control mechanism for disengaging the latch device from the keeper device, the remote control mechanism having a reciprocable wire element coupled at one end to a spring-loaded sensor device mounted on a vehicle door pillar for abutment by a vehicle door when the latter is in closed position, wherein the improvement comprises:

a latch device displacing means fulcrummed on the seat cushion supporting structure adjacent the keeper device and having a part thereof in abutting relation to the latch device when the latter is in keeper device engaging position, the latch device at all times being freely movable away from abutment with the abutting part of the latch device displacing means, and coupling the disengaging means to the reciprocable wire element for movement in response to movement of the sensor device into the door opening when the vehicle door is moved out of abutting relation to the sensor upon the door being opened, whereby upon being moved by the reciprocable wire element the latch device displacing means engages the latch device and drives the latter against the resistance of its spring means out of engagement with the keeper device to permit tilting movement of the backrest.

2. A vehicle seat latching system according to claim 1, in which:

the latch device displacing means comprises a lever pivoted intermediate its ends on the seat cushion supporting structure, the lever having an upstanding arm underlying the keeper device in abutting relation to the latch device and the depending arm receiving the coupling means coupling the wire element to the latch device displacing means.

3. A vehicle seat latching system according to claim 2, in which:

an auxiliary lever means is mounted on the backrest frame structure and is coupled to the latch device for moving the latter independently of the remote control mechanism.

4. A vehicle seat latching system according to claim 1, in which:

an auxiliary lever means is mounted on the backrest frame structure and is coupled to the latch device for moving the latter independently of the remote control mechanism.

* * * * *